United States Patent
Darayan et al.

(10) Patent No.: US 11,099,563 B2
(45) Date of Patent: Aug. 24, 2021

(54) MULTI-CONTROLLER SYNCHRONIZATION

(71) Applicant: Zoox, Inc., Foster City, CA (US)

(72) Inventors: Shayan Darayan, Sugar Land, TX (US); Joseph Funke, Redwood City, CA (US); Marc Wimmershoff, San Jose, CA (US)

(73) Assignee: Zoox, Inc., Foster City, CA (US)

( * ) Notice: Subject to any disclaimer, the term of this patent is extended or adjusted under 35 U.S.C. 154(b) by 260 days.

(21) Appl. No.: 16/226,542

(22) Filed: Dec. 19, 2018

(65) Prior Publication Data

US 2020/0201324 A1  Jun. 25, 2020

(51) Int. Cl.
*G05D 1/00* (2006.01)
*G05D 1/02* (2020.01)
*B60W 30/095* (2012.01)

(52) U.S. Cl.
CPC ....... *G05D 1/0088* (2013.01); *B60W 30/0956* (2013.01); *G05D 1/0214* (2013.01); *G05D 1/0238* (2013.01); *G05D 2201/0213* (2013.01)

(58) Field of Classification Search
CPC .............................. G05D 1/0088; B60W 30/00
See application file for complete search history.

(56) References Cited

U.S. PATENT DOCUMENTS

| | | | | |
|---|---|---|---|---|
| 10,310,469 B2 * | 6/2019 | Pauchet | ............... | G06F 11/2028 |
| 2017/0123429 A1 * | 5/2017 | Levinson | ................ | G01C 21/34 |
| 2017/0227968 A1 * | 8/2017 | Klinger | .................... | H01Q 3/26 |
| 2017/0269594 A1 * | 9/2017 | Sydnor | ................. | B64C 39/024 |
| 2017/0277153 A1 * | 9/2017 | Samii | ................ | G05B 19/0425 |
| 2019/0193747 A1 * | 6/2019 | Golov | ............... | B60W 50/0205 |
| 2019/0361419 A1 * | 11/2019 | Maruyama | ............. | G08C 17/02 |
| 2020/0076343 A1 * | 3/2020 | Zhang | ........................ | H02P 5/46 |
| 2020/0148218 A1 * | 5/2020 | Huang | .................. | B60W 30/18 |

FOREIGN PATENT DOCUMENTS

| CN | 1722030 A | 1/2006 |
|---|---|---|
| DE | 102016205780 A1 | 10/2017 |

OTHER PUBLICATIONS

PCT Search Report and Written Opinion dated Mar. 26, 2020 for PCT Application No. PCT/US2019/067070, 9 pages.

\* cited by examiner

*Primary Examiner* — Jess Whittington
(74) *Attorney, Agent, or Firm* — Lee & Hayes, P.C.

(57) ABSTRACT

A vehicle can include a primary computing device and a secondary computing device. The primary computing device can receive a trajectory and can generate control data to control the vehicle based on a computed state. Further, the primary computing device can send the internal data to the secondary computing device configured to control the vehicle in the event of a failure of the primary computing device. The secondary computing device can receive the internal data as first internal data and determine a capability associated with the primary computing device. Using the first internal data, the secondary computing device can determine second internal data and, based on the capability (e.g., in event of a failure of the primary computing device), can control the vehicle to follow a trajectory using the second internal data. Transferring state between an active to a standby computing device can ensure algorithmic synchronization and safe operation.

20 Claims, 6 Drawing Sheets

MULTI-CONTROLLER SYNCHRONIZATION

BACKGROUND

A vehicle can use multiple computing systems to control actuator(s) and/or drive system(s) of the vehicle. During operation of the vehicle, the multiple computing systems can reach an asynchronous state. The asynchronous state can lead to suboptimal performance of the vehicle during, for example, a transition of control from one computing system to another.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
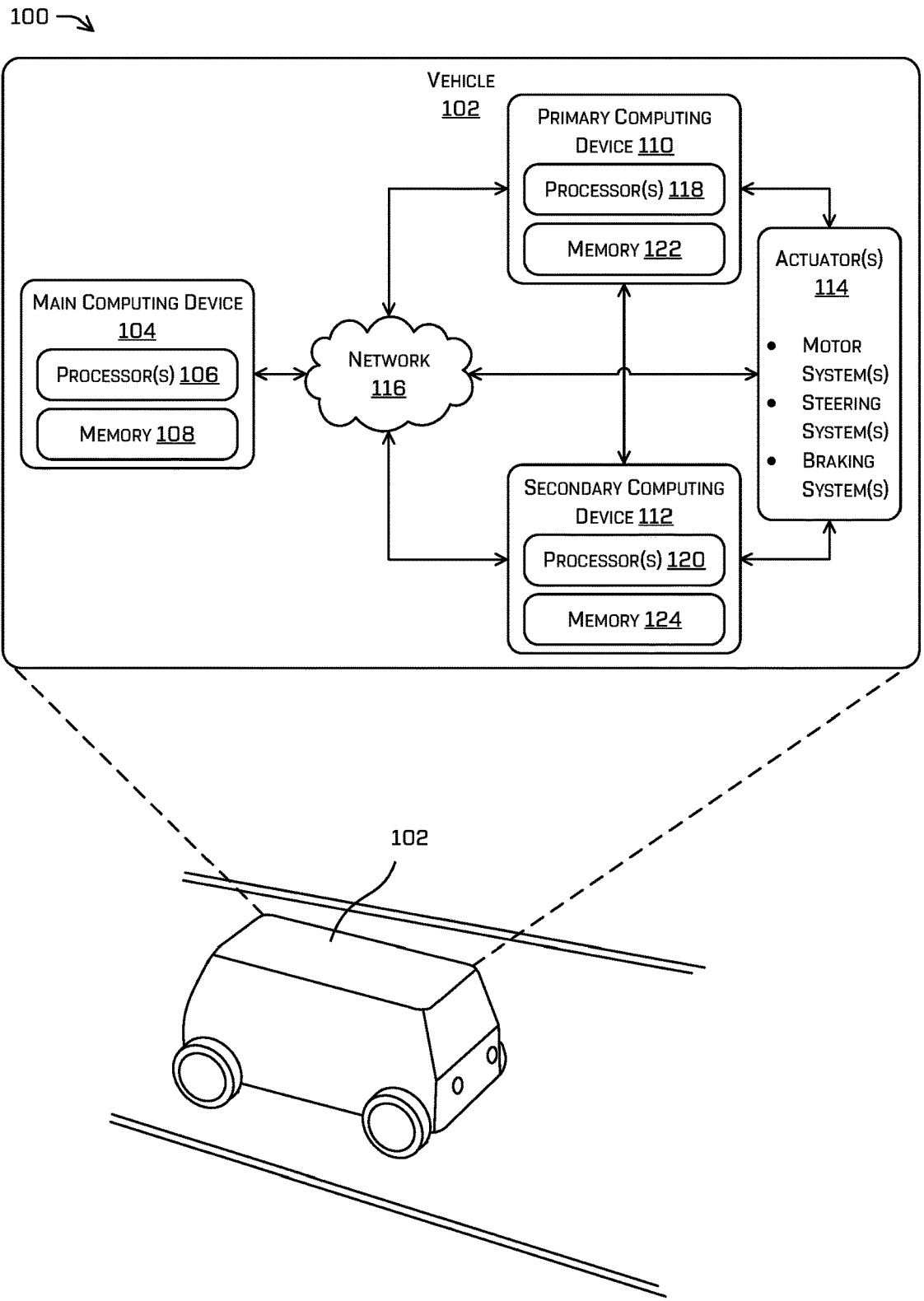
FIG. 1 depicts an example vehicle and a block diagram of an example architecture.

This disclosure describes systems, methods, and apparatuses for performing multi-controller synchronization using one or more computing devices of a vehicle. For example, an autonomous vehicle can use sensors to capture sensor data corresponding to an environment of the vehicle. The sensor data can include data associated with, for example, road surfaces, road markers, sidewalks, signage, and/or objects (e.g., pedestrians, vehicles, bicyclists, etc.). Based on the sensor data, the vehicle can determine a trajectory using, for example, a main computing device to navigate and/or follow through the environment.

In some instances, a first (or primary) computing device (also referred to as the first tracker or the first controller) of the vehicle can receive a trajectory generated by a main computing device (also referred to as a computing device). For example, a trajectory can comprise control information associated with controlling the vehicle to traverse through an environment (e.g., any one or more of an acceleration, steering angle, and the like). In some instances, the trajectory can comprise control information to safely bring the vehicle to a stop (e.g., braking and steering information to avoid and/or mitigate a collision). In some instances, the trajectory can comprise control information to execute an emergency stop (e.g., maximum deceleration while maintaining a current steering control). Based on the trajectory, the first computing device can determine first internal data based on, for example, a trajectory execution algorithm. Using the internal data, the first computing device can determine first control data that can be transmitted to an actuator(s) (e.g., a motor system(s), a steering system(s), and/or a braking system(s)) to control the vehicle. In some instances, the first computing device can use the internal data and vehicle data, also referred to as vehicle state data (e.g., current/previous position(s) of the vehicle and/or current/previous velocit(ies) of the vehicle). In some instances, the first computing device can control the vehicle and can transmit the first internal data to a second (or secondary) computing device (also referred to as the second tracker). In some instances, the second computing device can control the vehicle in the event of a failure of the first computing device and can include identical or similar capabilities of the first computing device. In some instances, the second computing device can include reduced capabilities compared to the first computing device or vice versa. By transmitting the first internal data to the second computing device, the second computing device can receive and/or maintain a current status of the vehicle and can, for example, improve the transition of control from the first computing device to the second computing device and vice versa.

In some instances, the second computing device can maintain a standby state while the first computing device controls the vehicle. Then, the second computing device can determine a capability status associated with the first computing device. In some instances, the capability status can indicate an error (or an error state/error condition/fault condition) associated with the first computing device. In some instances, the first internal data can be associated with a timestamp and/or a valid time period. When a time period associated with the first internal data expires, the first internal data can be determined to be stale and the second computing device can determine a capability status that indicates that the first computing device is not operating correctly. In some instances, the second computing device can receive a "heartbeat" signal associated with the first computing device. The absence of the heartbeat signal can indicate a fault and the second computing device can determine a capability status that indicates that the first computing device is not operating correctly. In some instances, the second computing device can receive a capability status including command data and/or a command that the second computing device should transition to an active state and control the vehicle.

Based on the capability status, the second computing device can transition to the active state. That is, the second computing device can assume control of the vehicle to control the vehicle to follow a trajectory. Additionally, the second computing device can, using the first internal data, determine second internal data. The second computing device can, using the second internal data, determine second control data and can transmit the second control data to the actuator(s) to continue control of the vehicle. Similar to the first computing device, the second computing device can transmit the second internal data to the first computing device allowing for the first computing device to receive and/or maintain the current status of the vehicle.

In some instances, the first computing device can return to an operational state and, based on the second internal data, determine additional internal data to continue control of the vehicle. Additionally, the second computing device can return to a standby state as the first computing device returns to an active state.

As can be understood, any period of downtime of a computing device can often incur a significant of cost in terms of the amount of time and data processing required to recover from the downtime. Further, a lack of synchronization between computing systems can lead to stale data and performing calculations on invalid or erroneous data and therefore increasing power consumption and increasing network congestion with data that may not be valid. Further, control algorithms can include PID (proportional-integral-derivative) controllers that can build error when operating in standby without discharging error associated with any such integration. In some examples, a second computing device assuming control of a vehicle from a first computing device without using the techniques discussed herein could result in abrupt steering controls or deceleration controls, leading to uncomfortable or unsafe vehicle behavior.

For example, while controlling the vehicle, the first computing device can determine first internal data that includes a difference between the vehicle's position and the received trajectory. While operating, the first computing device can determine adjustments to control data to correct the vehicle's position to achieve the received trajectory. The second computing device, while operating in a standby mode, can determine a similar difference between the vehicle's position and the received trajectory. In some instances, however, the second computing device may calculate second internal data that does not account for a correction resulting in a growing difference. In some instances, if the first computing device malfunctions and the second computing device assumes control, the growing difference can result in an overcorrection that can be mitigated and/or avoided by using the techniques described herein.

Traditional methods can impact reliability and availability of an autonomous vehicle by continually recalculating paths and trajectories based on invalid and/or erroneous data and also consume a significant amount of processing time. Meanwhile, methods of determining a path for a vehicle in an environment must provide accurate results, particularly in the context of vehicles and autonomous vehicles. Therefore, the techniques describe herein can address the technical problem of managing a change or degradation of computational resources in a computing system of a vehicle.

Additionally, the techniques discussed herein can improve a functioning of a computing device by reducing the amount of processing of erroneous or invalid data and preserving computing resources. In some instances, reducing the amount of computing resources takes the form of more efficiently processing the data. Additionally, in some instances, reducing the amount of computing resources includes reducing processing time, reducing memory usage, reducing network congestion, and/or reducing power consumption. The techniques described herein can also maintain and/or increase the availability of a vehicle's tracker for controlling a vehicle. As can be understood, maintaining the operation of a computing system in a vehicle can improve safety outcomes, particularly in the context of autonomous vehicles. Thus, the techniques described herein can improve a functioning of a computing device as well as improve safety outcomes.

The techniques described herein can be implemented in a number of ways. Example implementations are provided below with reference to the following figures. Although discussed in the context of an autonomous vehicle, the techniques described herein can be applied to a variety of systems requiring determination and detection of objects, and is not limited to autonomous vehicles. In another example, the systems, methods, and apparatuses can be used in an aviation or nautical context. Further, although discussed in the context of a tracker system, the techniques discussed herein can be applied to any redundant computing architecture associated with transitioning between state-based control algorithms. Additionally, the techniques described herein can be used with real data (e.g., captured using sensor(s)), simulated data (e.g., generated by a simulator), or any combination of the two.

FIG. 1 illustrates an example environment 100 through which an example vehicle 102 is traveling. The example vehicle 102 can be a driverless vehicle, such as an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. In such examples, because the vehicle 102 can be configured to control all functions from start to completion of the trip, including all parking functions, it may not include a driver and/or controls for driving the vehicle 102, such as a steering wheel, an acceleration pedal, and/or a brake pedal. This is merely an example, and the systems and methods described herein may be incorporated into any ground-borne, airborne, or waterborne vehicle, including those ranging from vehicles that need to be manually controlled by a driver at all times, to those that are partially or fully autonomously controlled. In some instances, the techniques can be implemented in any system using stateful control algorithms, and is not limited to vehicle tracking systems.

The example vehicle 102 can be any configuration of vehicle, such as, for example, a van, a sport utility vehicle, a cross-over vehicle, a truck, a bus, an agricultural vehicle, and/or a construction vehicle. The vehicle 102 can be powered by one or more internal combustion engines, one or more electric motors, hydrogen power, any combination thereof, and/or any other suitable power sources. Although the example vehicle 102 has four wheels, the systems and methods described herein can be incorporated into vehicles having fewer or a greater number of wheels, tires, and/or tracks. The example vehicle 102 can have four-wheel steering and can operate generally with equal or similar performance characteristics in all directions, for example, such that a first end of the vehicle 102 is the front end of the vehicle 102 when traveling in a first direction, and such that the first end becomes the rear end of the vehicle 102 when traveling in the opposite direction. Similarly, a second end of the vehicle 102 is the front end of the vehicle when traveling in the second direction, and such that the second end becomes the rear end of the vehicle 102 when traveling in the opposite direction. These example characteristics may facilitate greater maneuverability, for example, in small spaces or crowded environments, such as parking lots and/or urban areas.

A vehicle such as the example vehicle 102 can be used to travel through an environment and capture data. For example, the vehicle 102 can include one or more sensors where, for purposes of illustration, the one or more sensors can be one or more time-of-flight sensors, lidar sensors, radar sensors, sonar sensors, image sensors, audio sensors, infrared sensors, location sensors, etc., or any combination thereof, although other types of sensors are contemplated.

As the vehicle 102 travels through an environment, the sensors can capture sensor data associated with the environment. Additionally, some of the sensor data can be associated with objects (e.g., trees, vehicles, and/or pedestrians). The sensor data can be associated with other objects including, but not limited to, buildings, road surfaces, signage, barriers, etc.

As discussed above, the vehicle 102 can include a main computing device 104 (also referred to as a trajectory computing unit). The main computing device 104 can include one or more processors 106 and memory 108 communicatively coupled to the one or more processors 106. The one or more processors 106 can include, for example, one or more FPGAs, SoCs, ASICs, GPUs, and/or CPUs. Then, the main computing device 104 can use the sensor data to generate a trajectory for the vehicle 102. In some examples, such a trajectory may comprise a series of desired positions, orientations, velocities, accelerations, etc. along a path and/or corresponding control information (e.g., steering angles, accelerations, etc.) to cause the vehicle 102 to follow such a trajectory. In some instances, the main computing device 104 can also determine pose data associated with a position of the vehicle 102. For example, the main computing device 104 can use the sensor data to determine position data, coordinate data, and/or orientation data of the vehicle 102 in the environment. In some instances, the pose data can include location information (e.g., x-y-z coordinates) and/or can include orientation information (e.g., pitch, roll, and yaw data) associated with the vehicle 102.

While discussed in the context of synchronizing controllers for executing a trajectory in an autonomous vehicle, the techniques discussed herein are not limited to operations associated with trajectories, and can be applied to any controller system including synchronizing between control algorithms.

In some instances, the main computing device 104 can be communicatively coupled to a primary (or a first) computing device 110, a secondary (or a second) computing device 112, and/or actuator(s) 114 via a network 116. In some instances, the main computing device 104 can be coupled to one or more of the primary computing device 110, the secondary computing device 112, and/or actuator(s) 114 without the use of the network 116. Further, in some instances, the coupling among the main computing device 104, the primary computing device 110, the secondary computing device 112, and/or the actuator(s) 114 can include a unidirectional coupling or a bidirectional coupling based on criteria (e.g., bandwidth requirements, hardware limitations, etc.) of the various components of the vehicle 102.

In some instances, the trajectory generated by the main computing device 104, can include a go trajectory, a no-go trajectory, and/or an emergency stop ("e-stop") trajectory, although other trajectories are contemplated. The go trajectory can indicate, for example, continued movement and/or operation of the vehicle 102. A go trajectory can include any trajectory to traverse through an environment such as, for purposes of illustration only, maintaining a velocity of the vehicle 102, reducing a speed before turning the vehicle 102, reducing a speed to maintain a steering angle of the vehicle 102. The no-go trajectory can indicate, for example, a stopping movement and/or operation of the vehicle 102. A no-go trajectory can include any trajectory to safely stop the vehicle 102 in an environment such as, for purposes of illustration only, reducing a velocity of the vehicle 102 and pulling the vehicle 102 over on to a shoulder or a side of a road, reducing a velocity of the vehicle 102 while avoiding obstacles and stopping the vehicle 102 to minimize impact on surrounding traffic, and coming to a safe stop when convenient and/or at a particular destination. In some examples, the e-stop trajectory may comprise an instruction for maximum deceleration and may not include a steering command (or may include a command to maintain the last valid steering instruction). In some examples, the e-stop trajectory can indicate that the vehicle 102 should come to a safe stop as soon as possible while avoiding all collisions and/or otherwise mitigating damage. In some instances, the e-stop trajectory can be associated with a fault and/or an error with the main computing device 104, the primary computing device 110, the secondary computing device 112, the actuator(s) 114, and/or the network 116. In some instances, the e-stop trajectory can be associated with a different system and/or component of the vehicle 102.

The primary computing device 110 and the secondary computing device 112 can include one or more processors 118 and 120. In some instances, the one or more processors 118 and/or 120 can be similar to the one or more processors 106 of the main computing device 104 with similar capabilities. In other instances, the one or more processors 118 and/or 120 can have differing capabilities with the one or more processors 106. In some instances, the primary computing device 110 and the secondary computing device 112 can include a memory 122 and 124, respectively, that are communicatively coupled to the one or more processors 118 and 120, respectively.

As discussed above, the primary computing device 110 and the secondary computing device 112 can be configured to determine internal data. The internal data can be based on, for example, a trajectory execution algorithm and/or a proportional-integral-derivative algorithm. Though described herein as a PID controller for illustrative purposes, any algorithm which is based on historical calculations (e.g., by recursions, feedback, interpolations, and the like) is contemplated. In such examples, internal state may be a state (e.g., algorithm specific data) required for computation of the algorithm at a subsequent time. Using the internal data, the primary computing device 110 can determine control that includes, for example, acceleration data, steering data, power data, and/or braking data. In some instances, the primary computing device 110 can determine vehicle data that can include previous and/or current steering angle(s) commands indicating the steering commands issued by the primary or secondary computing devices 110 and/or 112, previous and/or current velocity data indicating a previous velocity of the vehicle 102, previous and/or current acceleration command(s) indicating previous and/or current power and/or acceleration commands issued by the primary or secondary computing devices 110 and/or 112, vehicle pitch data indicating a pitch associated with the vehicle 102, time data indicating a timestamp associated with the internal data, steering angle feedback data associated with the actuator(s) 114, and/or previous trajectory data indicating a previous trajectory of the vehicle 102. In some instances, the primary computing device 110 can use the vehicle data and the internal data to determine the control data.

As discussed above, in some instances, the primary computing device 110 and the secondary computing device 112 can individually include one or more algorithms that include a proportional-integral (PI) controller (or a proportional-integral-derivative (PID) controller). The primary and/or secondary computing devices 110 and 112 can determine a proportional term that is based on a set point indicating a desired position, orientation, and/or trajectory for the vehicle 102 and a process variable indicating a measured and/or actual position, orientation, and/or trajectory of the vehicle 102. The primary and/or secondary computing devices 110 and 112 can also determine an integral term that is based on previous proportional terms and an integration of the proportional terms over a time period. As discussed above, the integral term can, for example, accumulate and become a source of instability between the primary computing device 110 and the secondary computing device 112. In some instances, the primary and/or secondary computing devices 110 and 112 can also determine a derivative term that is based on a current rate of change to determine a future proportional term error. In some instances, the primary and/or secondary computing device 110 and 112 can also determine a derivative term that can estimate and/or predict a future change to the integral term based on a current rate of change to the integral term.

In some instances, the actuator(s) 114 can include motor system(s), steering system(s), and/or braking system(s). The actuator(s) 114 can be configured to provide feedback data to the primary and/or secondary computing devices 110 and 112. For example, the actuator(s) 114 can receive the control data transmitted by the primary and/or secondary computing devices 110 and 112 and use the control data to control the vehicle 102. In some instances, the vehicle 102 may or may not precisely follow the route indicated by the control data. The actuator(s) can provide feedback data to the primary and/or secondary computing device 110 and 112 indicating the performance of the vehicle 102. The primary and/or secondary computing device 110 and 112 can use the feedback data to determine if the vehicle 102 has been controlled according to the control data or use the feedback data to determine a deviation. In some instances, the primary and/or secondary computing devices 110 and 112 can use sensor data to determine the deviation. In some instances, the primary and/or secondary computing device 110 and 112 can use a combination of the feedback data and the sensor data to determine the deviation.

In some instances, the primary computing device 110 can operate in an active state while the secondary computing device 112 operates in a standby state. During the active state, the primary computing device 110 can receive the trajectory from the main computing device 104. Based on the trajectory and the first internal data, the primary computing device 110 can generate first control data and transmit the first control data to the actuator(s) 114. As discussed above, the actuator(s) 114 can use the first internal data to determine the first control data where the control data is used to control and operate the systems of the vehicle 102 according to the trajectory. In some instances, the primary computing device 110 can transmit the first internal data to the secondary computing device 112 as the secondary computing device 112 operates in the standby state. Then, the secondary computing device 112 can store the first internal data in the memory 124.

The secondary computing device 112 can be configured to determine a capability status or state (e.g., an error status, a malfunction status, a reboot status, a power up status, an operational status, a non-operational status, etc.) of the primary computing device 110 while the secondary computing device is in the standby state.

As a non-limiting example, the primary computing device 110 can be configured to periodically transmit the first internal data to the secondary computing device 112. In some instances, the primary computing device 110 can transmit the first internal data at a fixed frequency (e.g., once per second). In some instances, the primary computing device 110 can transmit the internal data at an intermittent frequency or based upon a threshold internal data value (e.g., a difference in internal data above a threshold) or control event. Then, the secondary computing device 112 can determine that a time period associated with the first internal data has expired. In some instances, the secondary computing device 112 can maintain a timer and reset the timer as it receives internal data from the primary computing device 110. If the timer meets or exceeds a threshold amount of time, the secondary computing device 112 can determine that the capability status of the primary computing device 110 is, for example, a malfunctioning status. In some instances, the internal data can include valid time data indicating a period of time that the internal data is valid and the secondary computing device 112 can determine the capability status based on the valid time data. In some instances, the secondary computing device 112 can receive a heartbeat signal from the primary computing device 110 and determine the capability status if a time period associated with the heartbeat signal expires.

As another non-limiting example, the secondary computing device 112 can receive a capability status (e.g., from the primary computing device 110 and/or the main computing device 104) including error data and/or indicating an error associated with the primary computing device 110. In some instances, the capability status can indicate a command to control the vehicle 102 and/or to transition to an active state.

Using the capability status, the secondary computing device 112 can transition to an active state. As the secondary computing device 112 operates in the active state, the secondary computing device 112 can receive the trajectory. In some instances, the main computing device 104 can transmit the trajectory to the active computing device. In other instances, the main computing device 104 can transmit the trajectory to both the active and the standby computing devices. The secondary computing device 112 can be configured to determine a trajectory. As a non-limiting example, the secondary computing device 112 can receive and/or determine a capability status associated with the primary computing device 110 indicating an error. Then, the secondary computing device 112 can determine, for example, an e-stop trajectory. In some instances, the secondary computing device 112 can be configured to determine a variety of trajectories based on the capability status.

After receiving and/or determining the trajectory, the secondary computing device 112 can use the first internal data to determine second internal data. In some instances, the secondary computing device 112 can determine second internal data without using the first internal data or a portion of the first internal data.

After generating the second internal data, the secondary computing device 112 can determine second control data and transmit the second control data to the actuator(s) 114 to control the vehicle 102. Additionally, the secondary computing device 112 can be configured to transmit the second internal data to the primary computing device 110 and the primary computing device 110 can store the second internal data in memory 122. As the secondary computing device 112 operates in the active state, it can receive a capability status associated with the primary computing device 110. In some instances, the capability status can indicate that the primary computing device 110 is operational. Then, the secondary computing device 112 can transition to a standby state and the primary computing device 110 can assume control of the vehicle 102. In some instances, a handshake protocol occurs between the primary computing device 110 and the secondary computing device 112. For example, when the secondary computing device 112 determines that the primary computing device 110 is operational, the secondary computing device 112 can transmit the second internal data to transmit up-to-date internal data to the primary computing device 110. In some instances, the secondary computing device 112 can request time data associated with the internal data stored by the primary computing device 110. In some instances, the primary computing device 110 can indicate an acknowledgement of up-to-date internal data based on time data associated with the internal data stored at the primary computing device 110. After the primary and/or secondary computing device 110 and 112 confirm that the primary computing device 110 has up-to-date internal data, then the secondary computing device 112 can transition to the standby state and the primary computing device 110 can transition to the active state.

In some instances, the main computing device 104, the primary computing device 110, and/or the secondary computing device 112 can determine a latched trajectory. The latched trajectory can indicate that the vehicle 102 cannot exit the latched trajectory unless certain criteria are met. For purposes of illustration only, the latched trajectory can be a latched e-stop trajectory. The criteria can indicate that the vehicle comes to a complete stop and receives an all clear signal from, for example, a remote computing device that performs a diagnostic on the vehicle. Once the criteria are met, then the vehicle 102 can proceed to a different trajectory.

Figure 2:
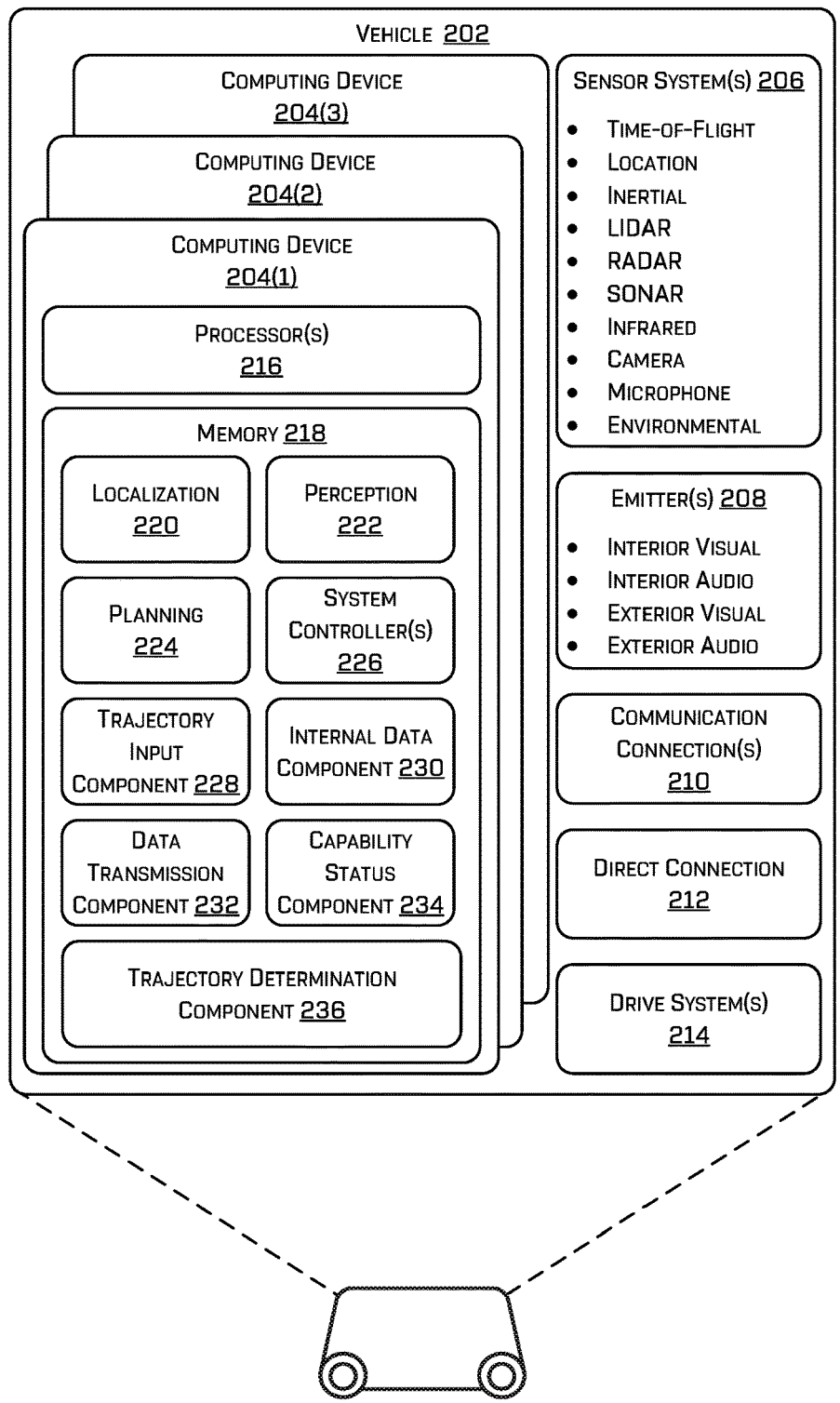
FIG. 2 depicts a block diagram of an example system for implementing the techniques described herein.

FIG. 2 depicts a block diagram of an example system 200 for implementing the techniques discussed herein. In at least one example, the system 200 can include a vehicle 202, which can be similar to the vehicle 102 described above with reference to FIG. 1. In the illustrated example 200, the vehicle 202 is an autonomous vehicle; however, the vehicle 202 can be any other type of vehicle.

The vehicle 202 can include a computing device 204(1), a computing device 204(2), a computing device 204(3), one or more sensor systems 206, one or more emitters 208, one or more communication connections 210, at least one direct connection 212 (e.g., for physically coupling with the vehicle 202 to exchange data and/or to provide power), and one or more drive systems 214. In some instances, vehicle 202 can include more or fewer instances of computing device 204. The one or more sensor systems 206 can be configured to capture sensor data associated with an environment.

In at least one example, the computing device 204(1) can be similar to the main computing device 104, the computing device 204(2) can be similar to the primary computing device 110, and the computing device 204(3) can be similar to the secondary computing device 112 described above with reference to FIG. 1. The computing device 204(1) can include one or more processors 216 and memory 218 communicatively coupled with the one or more processors 216. In at least one instance, the one or more processors 216 can be similar to the processor(s) 106, 118, and 120 and the memory 218 can be similar to the memory 108, 122, and 124 described above with reference to FIG. 1. In the illustrated example, the memory 218 of the computing device 204(1) stores a localization component 220, a perception component 222, a planning component 224, one or more system controllers 226, a trajectory input component 228, an internal data component 230, an data transmission component 232, a capability status component 234, and a trajectory determination component 236. Though depicted as residing in the memory 218 for illustrative purposes, it is contemplated that the localization component 220, the perception component 222, the planning component 224, the one or more system controllers 226, the trajectory input component 228, the internal data component 230, the data transmission component 232, the capability status component 234, and the trajectory determination component 236 can additionally, or alternatively, be accessible to the computing device 204(1) (e.g., stored in a different component of vehicle 202 and/or be accessible to the vehicle 202 (e.g., stored remotely).

As discussed above, in at least one example, the computing device 204(2) can be similar to the primary computing device 110 and the computing device 204(3) can be similar to the secondary computing device 112 described above with reference to FIG. 1. The computing devices 204(2) and 204(3) can be configured similarly to computing device 204(1). In some instances, computing devices 204(1), 204(2), and 204(3) can have identical components and/or identical computational resources. In some instances, computing devices 204(1), 204(2), and 204(3) can have different components and/or different computational resources. In some instances, computing device 204(1) can have more computational resources than computing device 204(2) which in turn can have more computational resources than computing device 204(3).

In at least one example, the localization component 220 can include functionality to receive data from the sensor system(s) 206 to determine a position of the vehicle 202. For example, the localization component 220 can include and/or request/receive a three-dimensional map of an environment and can continuously determine a location of the autonomous vehicle within the map. In some instances, the localization component 220 can use SLAM (simultaneous localization and mapping) or CLAMS (calibration, localization and mapping, simultaneously) to receive time-of-flight data, image data, lidar data, radar data, sonar data, IMU data, GPS data, wheel encoder data, or any combination thereof, and the like to accurately determine a location of the autonomous vehicle. In some instances, the localization component 220 can provide data to various components of the vehicle 202 to determine an initial position of an autonomous vehicle for generating a trajectory, as discussed herein.

In some examples, the perception component 222 can include functionality to perform object detection, segmentation, and/or classification. In some examples, the perception component 222 can provide processed sensor data that indicates a presence of an entity that is proximate to the vehicle 202 and/or a classification of the entity as an entity type (e.g., car, pedestrian, cyclist, building, tree, road surface, curb, sidewalk, unknown, etc.). In additional and/or alternative examples, the perception component 222 can provide processed sensor data that indicates one or more characteristics associated with a detected entity and/or the environment in which the entity is positioned. In some examples, characteristics associated with an entity can include, but are not limited to, an x-position (global position), a y-position (global position), a z-position (global position), an orientation, an entity type (e.g., a classification), a velocity of the entity, an extent of the entity (size), etc. Characteristics associated with the environment can include, but are not limited to, a presence of another entity in the environment, a state of another entity in the environment, a time of day, a day of a week, a season, a weather condition, an indication of darkness/light, etc.

In some instances, the planning component 224 can determine a path for the vehicle 202 to follow to traverse through an environment. For example, the planning component 224 can determine various routes and paths and various levels of detail. For example, the planning component 224 can determine a route to travel from a first location (e.g., a current location) to a second location (e.g., a target location). For the purpose of this discussion, a route can be a sequence of waypoints for traveling between two locations. As non-limiting examples, waypoints include streets, intersections, global positioning system (GPS) coordinates, etc. Further, the planning component 224 can generate an instruction for guiding the autonomous vehicle along at least a portion of the route from the first location to the second location. In at least one example, the planning component 224 can determine how to guide the autonomous vehicle from a first waypoint in the sequence of waypoints to a second waypoint in the sequence of waypoints. In some examples, the instruction can be a path, or a portion of a path. In some examples, multiple paths can be substantially simultaneously generated (i.e., within technical tolerances) in accordance with a receding horizon technique. A single path of the multiple paths in a receding data horizon having the highest confidence level may be selected to operate the vehicle.

In other examples, the planning component 224 can alternatively, or additionally, use data from the perception component 222 to determine a path for the vehicle 202 to follow to traverse through an environment. For example, the planning component 224 can receive data from the perception component 222 regarding objects associated with an environment. Using this data, the planning component 224 can determine a route to travel from a first location (e.g., a current location) to a second location (e.g., a target location) to avoid objects in an environment. In at least some examples, such a planning component 224 may determine there is no such collision free path and, in turn, provide a path which brings vehicle 202 to a safe stop avoiding all collisions and/or otherwise mitigating damage.

In some examples, the planning component 224 can generate one or more trajectories for the vehicle 202 to follow, as discussed herein.

In at least one example, the computing device 204 can include one or more system controllers 226, which can be configured to control steering, propulsion, braking, safety, emitters, communication, and other systems of the vehicle 202. The system controllers 226 can be similar to the actuator(s) 114 described above with reference to FIG. 1. These system controller(s) 226 can communicate with and/or control corresponding systems of the drive system(s) 214 and/or other components of the vehicle 202, which may be configured to operate in accordance with a path provided from the planning component 224.

The computing device 204 can include a trajectory input component 228. As discussed above, the computing device 204(1) can operate as the main computing device 104 as described with reference to FIG. 1 and the computing device 204(2) and 204(3) can operate as the primary computing device 110 and the secondary computing device 112. The computing device 204(2) and/or 204(3) can receive a trajectory that includes, for example, a go trajectory, a no-go trajectory, and/or an e-stop trajectory via the trajectory input component 228. In some instances, the computing device 204 can be communicatively coupled to other computing devices through the network 116 as described with reference to FIG. 1. In some instances, the computing devices can be communicatively coupled without the network 116.

The computing device 204 can include an internal data component 230 to generate and/or determine internal data. As described above, the computing device 204 can use a trajectory to determine internal data. In some instances, the computing device 204 can use the trajectory and vehicle data to determine the internal data. For example, the internal data component 230 can receive data from the localization component 220, the perception component 222, the system controller(s) 226, and/or other component of the vehicle 202 to determine the vehicle data and use the vehicle data to generate the internal data. For example, the internal data component 230 can receive the trajectory from the trajectory input component 228. Then, the internal data component 230 can generate control data comprising commands for actuating steering and acceleration of the autonomous vehicle 202 to enable the autonomous vehicle 202 to follow the trajectory.

In at least some examples, any one or more computing device 204 may have independent localization components 220. In some such examples, each localization component 220 may perform a different algorithm to determine vehicle state. As a non-limiting example, computing device 204(2) may receive a trajectory from computing device 204(1), but determine a localization independently for calculation. In such an example, computing device 204(1) may use three-dimensional maps for localization, whereas computing device 204(2) may rely on a Kalman-type filter using wheel odometry and IMU measurements. In some examples, computing device 204(3) may or may not have its own localization component 220(3). In those examples where computing system 204(3) does not, vehicle state data may be provided by either of computing systems 204(1),(2).

In at least one example, the internal data component 230 can receive the trajectory and can compute control data including a steering angle and acceleration to enable the autonomous vehicle 202 to follow the trajectory. In some examples, the internal data component 230 can include a separate vehicle controller configured to control steering, propulsion, braking, safety, emitters, communication, and other systems of the vehicle. In some instances, the internal data component 230 can function as a PI (or PID) controller to generate the internal data. As discussed above, the actuator(s) 114 can generate feedback data. In some instances, the internal data component 230 can receive the feedback data to determine the internal data, the vehicle data, and/or the control data.

In some instances, the data transmission component 232 can transmit the internal data to a target. For example, and as discussed above, the computing device 204(2) can operate as the primary computing device 110 described above with reference to FIG. 1 and operate in the active state. To control the vehicle 202, the computing device 204(2) can transmit the control data to the actuator(s) 114 described above with reference to FIG. 1 by using the data transmission component 232. Additionally, the computing device 204(3) can operate as the secondary computing device 112 described above with reference to FIG. 1 and the computing device 204(2) can transmit the internal data to computing device 204(3) using the data transmission component 232 while computing device 204(3) operates in the standby state. In some instances, the computing device 204(3) can operate in the active state and use the data transmission component 232 to transmit internal data to the computing device 204(2).

The computing device 204 can include a capability status component 234. As discussed above, the computing device 204 can determine a capability status associated with a different computing device. For example, the computing device 204(2) can determine a capability status associated with the computing device 204(3) and/or vice versa. The capability status can indicate one or more of a normal status, an error, a fault, a malfunction, a reboot status, a power up status, etc. In some instances, the computing device 204 can determine the capability status by receiving the capability status from a different computing device. For example, computing device 204(2) can transmit the capability status associated with computing device 204(2) to computing device 204(3). In some instances, the capability status component 234 can determine the capability status using time data and/or the internal data. For example, a computing device 204 can receive internal data that indicates an expiration period. If the computing device 204 does not receive updated internal data before the expiration, the capability status component 234 can determine that a different computing device is malfunctioning and/or inoperative. In some instances, the computing device 204 can reset a timer when it receives internal data and can determine the capability status if the timer meets or exceeds a threshold value. In some instances, the computing device 204 can receive a heartbeat signal and can determine the capability status if a time period associated with the heartbeat signal expires.

In some instances, the computing device 204 can include a trajectory determination component 236 to determine and/or select a trajectory. In some instances, the trajectory determination component 236 can determine and/or select a trajectory for the vehicle based on the capability status, as discussed above. For purposes of illustration only, the capability status can indicate an error that meets or exceeds a severity threshold and the trajectory determination component 236 can determine an e-stop trajectory based on the error that meets or exceeds the severity threshold. In some instances, the trajectory determination component 236 can determine and/or select a go trajectory and/or a no-go trajectory based on the capability status, sensor data, and/or other operating conditions.

The sensor system(s) 206 can include time-of-flight sensors, location sensors (e.g., GPS, compass, etc.), inertial sensors (e.g., inertial measurement units (IMUs), accelerometers, magnetometers, gyroscopes, etc.), lidar sensors, radar sensors, sonar sensors, infrared sensors, cameras (e.g., RGB, IR, intensity, depth, etc.), microphone sensors, environmental sensors (e.g., temperature sensors, humidity sensors, light sensors, pressure sensors, etc.), ultrasonic transducers, wheel encoders, etc. The sensor system(s) 206 can include multiple instances of each of these or other types of sensors. For instance, the time-of-flight sensors can include individual time-of-flight sensors located at the corners, front, back, sides, and/or top of the vehicle 202. As another example, the camera sensors can include multiple cameras disposed at various locations about the exterior and/or interior of the vehicle 202. The sensor system(s) 206 can provide input to the computing device 204.

The vehicle 202 can also include one or more emitters 208 for emitting light and/or sound, as described above. The emitters 208 in this example include interior audio and visual emitters to communicate with passengers of the vehicle 202. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitters 208 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which may comprise acoustic beam steering technology.

The vehicle 202 can also include one or more communication connection(s) 210 that enable communication between the vehicle 202 and one or more other local or remote computing device(s). For instance, the communication connection(s) 210 can facilitate communication with other local computing device(s) on the vehicle 202 and/or the drive system(s) 214. Also, the communication connection(s) 210 can allow the vehicle to communicate with other nearby computing device(s) (e.g., other nearby vehicles, traffic signals, etc.). The communications connection(s) 210 also enable the vehicle 202 to communicate with a remote teleoperations computing device or other remote services.

The communications connection(s) 210 can include physical and/or logical interfaces for connecting the computing device 204(1) to another computing device (e.g., the computing device 204(2) or 204(3)) or an external network (e.g., the Internet). For example, the communications connection(s) 210 can enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.) or any suitable wired or wireless communications protocol that enables the respective computing device to interface with the other computing device(s).

In at least one example, the vehicle 202 can include one or more drive systems 214. In some examples, the vehicle 202 can have a single drive system 214. In at least one example, if the vehicle 202 has multiple drive systems 214, individual drive systems 214 can be positioned on opposite ends of the vehicle 202 (e.g., the front and the rear, etc.). In at least one example, the drive system(s) 214 can include one or more sensor systems to detect conditions of the drive system(s) 214 and/or the surroundings of the vehicle 202. By way of example and not limitation, the sensor system(s) can include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration of the drive system, cameras or other image sensors, ultrasonic sensors to acoustically detect objects in the surroundings of the drive system, lidar sensors, radar sensors, etc. Some sensors, such as the wheel encoders can be unique to the drive system(s) 214. In some cases, the sensor system(s) on the drive system(s) 214 can overlap or supplement corresponding systems of the vehicle 202 (e.g., sensor system(s) 206).

The drive system(s) 214 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 214 can include a drive system controller which can receive and preprocess data from the sensor system(s) and to control operation of the various vehicle systems. In some examples, the drive system controller can include one or more processors and memory communicatively coupled with the one or more processors. The memory can store one or more modules to perform various functionalities of the drive system(s) 214. Furthermore, the drive system(s) 214 also include one or more communication connection(s) that enable communication by the respective drive system with one or more other local or remote computing device(s).

The processor(s) 216 of the vehicle 202 and the processor(s) 106, 118, and 120 of the main computing device 104, the primary computing device 110, and the secondary computing device 112 of FIG. 1 can be any suitable processor capable of executing instructions to process data and perform operations as described herein. By way of example and not limitation, the processor(s) 216, 106, 118, and 120 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

The memory 218 and the memory 108, 122, and 124 of the main computing device 104, the primary computing device 110, and the secondary computing device 112 of FIG. 1 are examples of non-transitory computer-readable media. The memory 218, 108, 122, and 124 can store an operating system and one or more software applications, instructions, programs, and/or data to implement the methods described herein and the functions attributed to the various systems. In various implementations, the memory 218, 108, 122, and 124 can be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

In some instances, aspects of some or all of the components discussed herein can include any models, algorithms, and/or machine learning algorithms. For example, in some instances, the components in the memory 218, 108, 122, and 124 can be implemented as a neural network.

It should be noted that components of the computing device 204(1) can be associated with the main computing device 104, the primary computing device 110, and/or the secondary computing device 112.

Figure 3A:
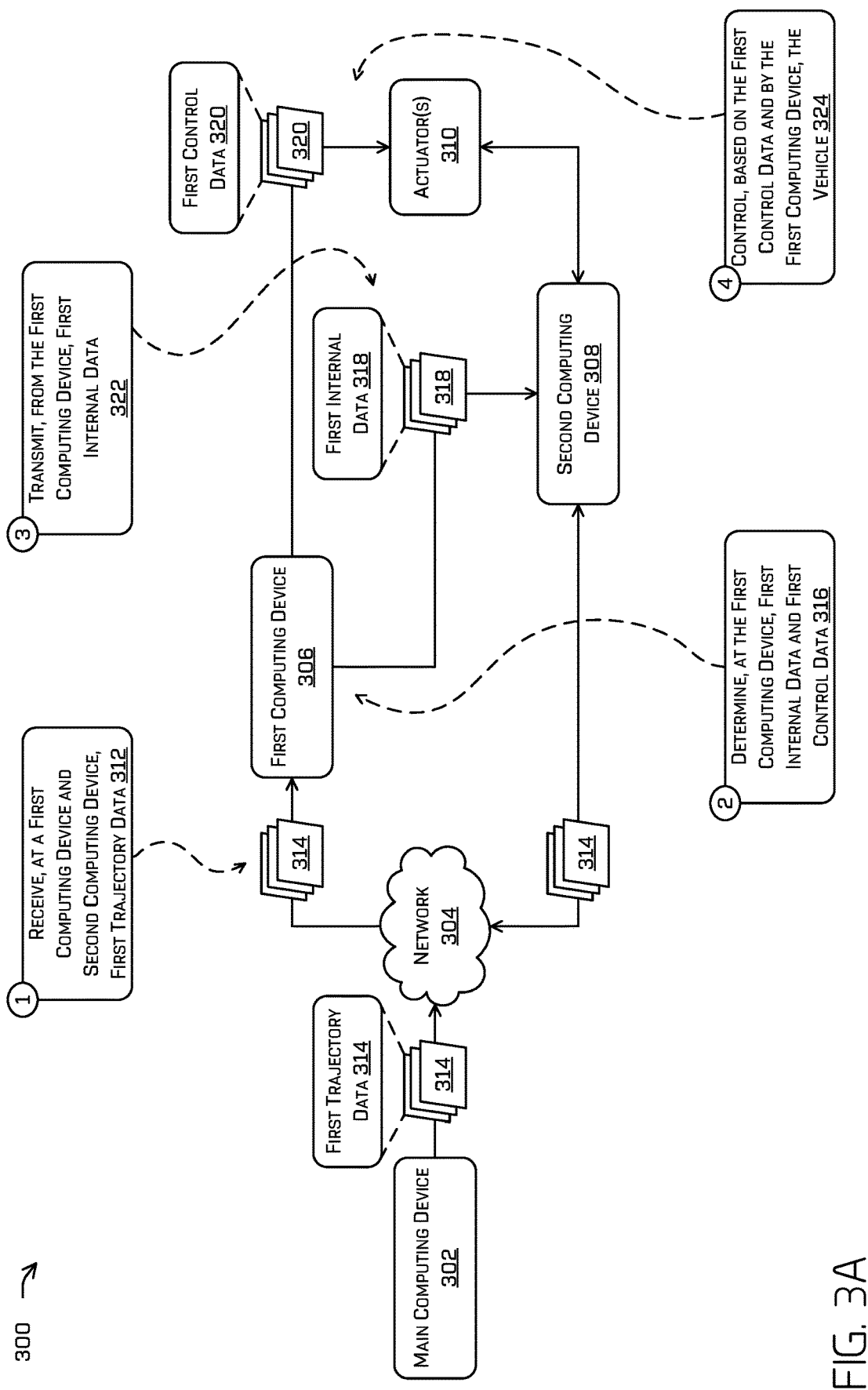
FIG. 3A depicts an example pictorial flow diagram of an example process of controlling a vehicle using a first computing device.
Figure 3B:
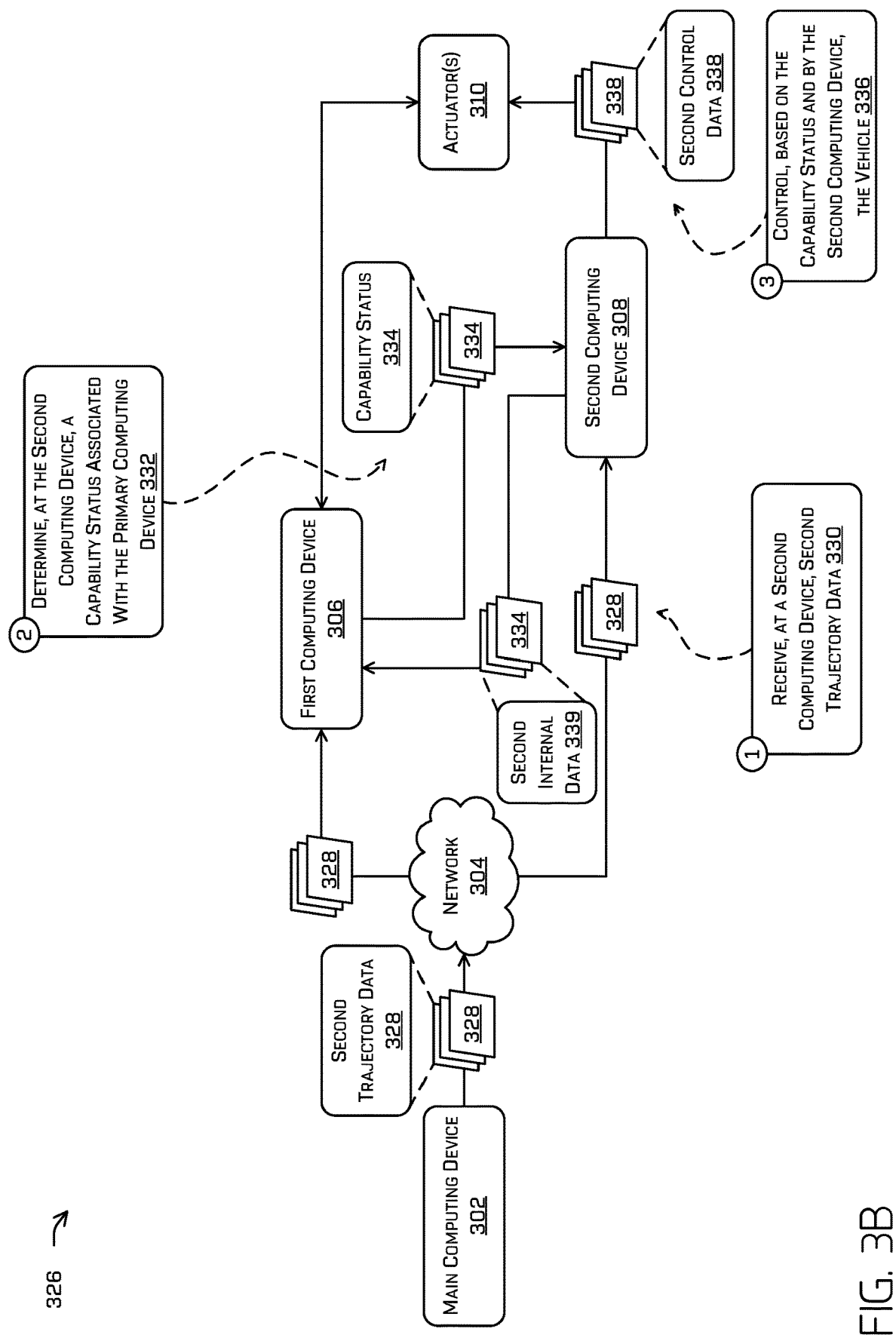
FIG. 3B depicts an example pictorial flow diagram of an example process of the second computing device of FIG. 3A controlling the vehicle based on a capability status associated with the first computing device of FIG. 3A.
Figure 3C:
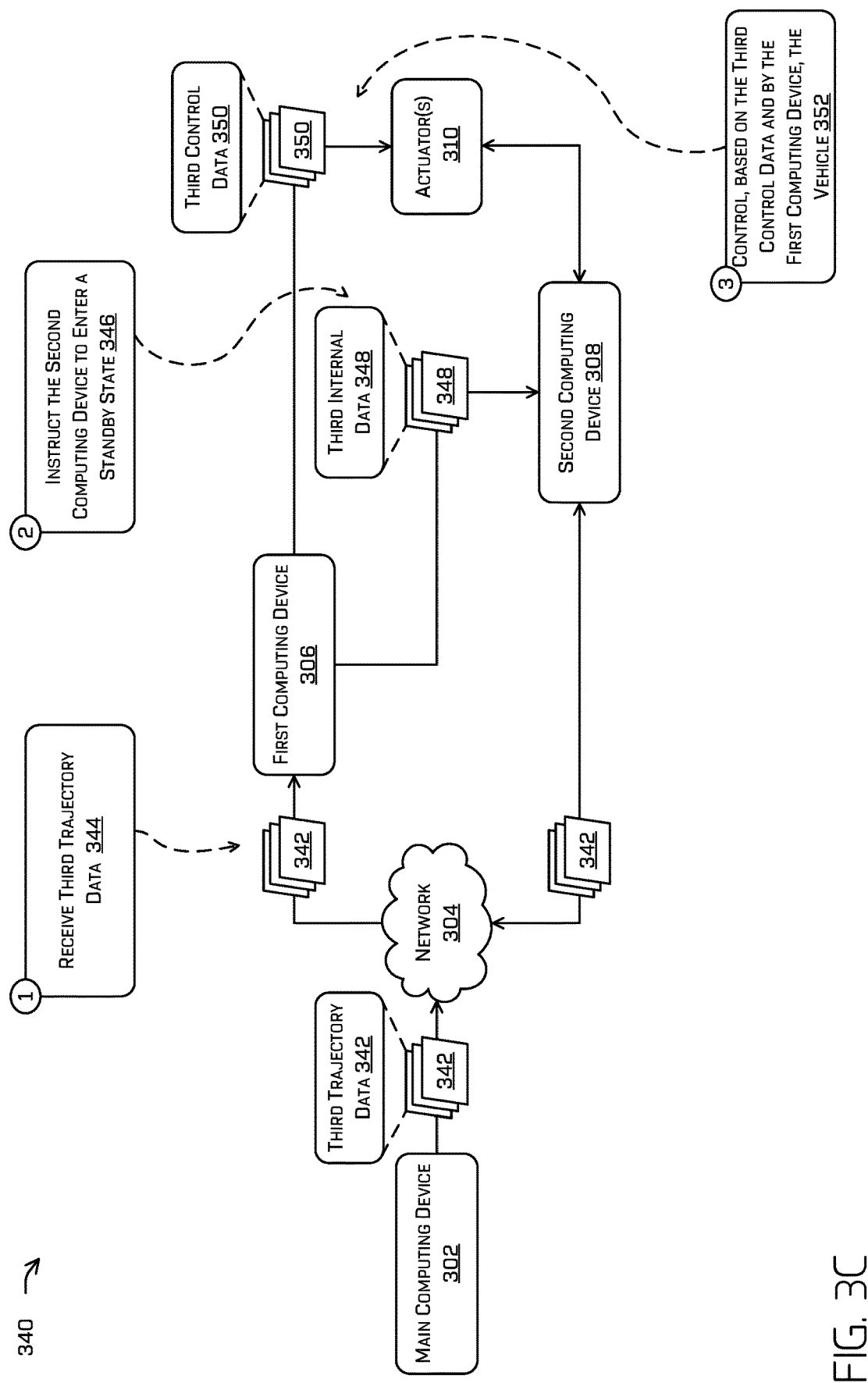
FIG. 3C depicts an example pictorial flow diagram of an example process of the second computing device of FIG. 3A determining a standby state and the first computing device of FIG. 3A controlling the vehicle.

FIG. 3A-3C depict an example pictorial flow diagram of example processes of a controlling the vehicle using the primary computing device and/or the secondary computing device. For examples, the example processes can include operations of the primary computing device transitioning from an active state, to a standby state, and back to an active state. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes. For example, some figures include numbering such as ①, ②, ③, etc. This numbering is intended to orient a reader to one possible order of operations, but is not intended to be construed as a limitation, as discussed herein.

FIG. 3A depicts an environment 300 with a main computing device 302, a network 304, a first computing device 306, a second computing device 308, and actuator(s) 310. In at least one example, the main computing device 302 can be similar to the main computing device 104, the network 304 can be similar to the network 116, the first computing device 306 can be similar to the primary computing device 110, the second computing device 308 can be similar to the secondary computing device 112, and the actuator(s) 310 can be similar to the actuator(s) 114 described above with reference to FIG. 1.

At operation 312, the first computing device 306 and the second computing device 308 can receive the first trajectory data 314 (also referred to as a first trajectory 314). The first trajectory 314 can include a go trajectory, a no-go trajectory, and/or an e-stop trajectory as described above.

At operation 316, the first computing device 306 can determine the first internal data 318 and first control data 320. In some examples, the first internal data 318 can be based at least in part on the first trajectory 314 and or vehicle data as described above. The first control data 320 can include data and/or commands for actuating steering, acceleration, and/or braking of the vehicle to follow the first trajectory 314.

At operation 322, the first computing device 306 can transmit the first internal data 318 to the second computing device 308.

At operation 324, the first computing device 306 can transmit the first control data 320 to the actuator(s) 310. In some instances, the first computing device 306 can transmit the first internal data 318 simultaneously (within technical tolerances) to the second computing device 308 and the control data to the actuator(s) 310. In other instances, the first computing device 306 can transmit the first internal data 318 independently and/or asynchronously to the second computing device 308 and the first control data 320 to the actuator(s) 310.

Further, at operation 324, the first computing device 306 can control the vehicle as the actuator(s) 310 respond to the first control data 320 transmitted by the first computing device 306 to the actuator(s) 310.

FIG. 3B depicts an environment 326 with the main computing device 302 transmitting a second trajectory 328. At operation 330, the first computing device 306 and the second computing device 308 receive the second trajectory 328.

At operation 332, the second computing device 308 determines a capability status 334 associated with the first computing device 306. For purposes of illustration only, the capability status 334 can indicate an error associated with the first computing device 306 such that it can no longer control the vehicle. In at least some examples, when transitioning the second computing device 308 to an active state and the first computing first computing device 306 to a standby state, one or more handoff procedures may be initiated. In at least some examples, such handoff may include additional data, besides the internal state of the first computing device 306. In at least some examples, the handoff comprises receiving and/or verifying internal state data and/or vehicle state provided from the first computing device 306.

At operation 336, the second computing device 308 can, based on the capability status 334 (and/or based at least in part on the first internal data 318 from FIG. 3A), determine second control data 338 and transmit the second control data 338 to the actuator(s) 310 to control the vehicle. Further, while the second computing device 308 controls the vehicle, the second computing device 308 can transmit second internal data 339 to the first computing device 306 to inform the first computing device 306 of the internal data 339 for subsequent synchronization. In at least some examples, when transitioning the first computing device 306 to an active state and the second computing device 308 to a standby state, one or more handoff procedures may be initiated. In at least some examples, such handoff may include additional data, besides the internal state of the second computing device 308. In at least some examples, the handoff comprises receiving and/or verifying internal state data and/or vehicle state provided from the second computing device 308.

FIG. 3C depicts an environment 340 with the main computing device 302 transmitting a third trajectory data 342 (also referred to as a third trajectory 342). At operation 344, the first computing device 306 and the second computing device 308 can receive the third trajectory data 342. In some examples, the third trajectory 342 can comprise a go trajectory, a no-go trajectory, and/or an e-stop trajectory as described above. In some examples, the third trajectory data 342 can be the same as or different than the first trajectory data 314.

Depending on an error associated with the first computing device 306, when resolved, the first computing device 306 can transition to an operative state and generate the third internal data 348. As described above with respect to FIG. 3B, such a transition may include a handoff procedure. In at least some examples, the transition comprises receiving and verifying internal state data and/or vehicle state provided from the second computing device 308.

At operation 346, the process can include instructing the second computing device 308 to enter a standby state. In some instances, the operation 346 can include the second computing device 308 receiving the third internal data 348 and, based on the third internal data 348, the second computing device 308 can determine a standby state associated with the second computing device 308. In some examples, the first computing device 306 can send an instruction to the second computing device 308 causing the second computing device 308 to enter a standby state.

At operation 352, the first computing device can control the vehicle as actuator(s) 310 respond to the third control data 350 transmitted by the first computing device 306 to the actuator(s) 310.

Figure 4:
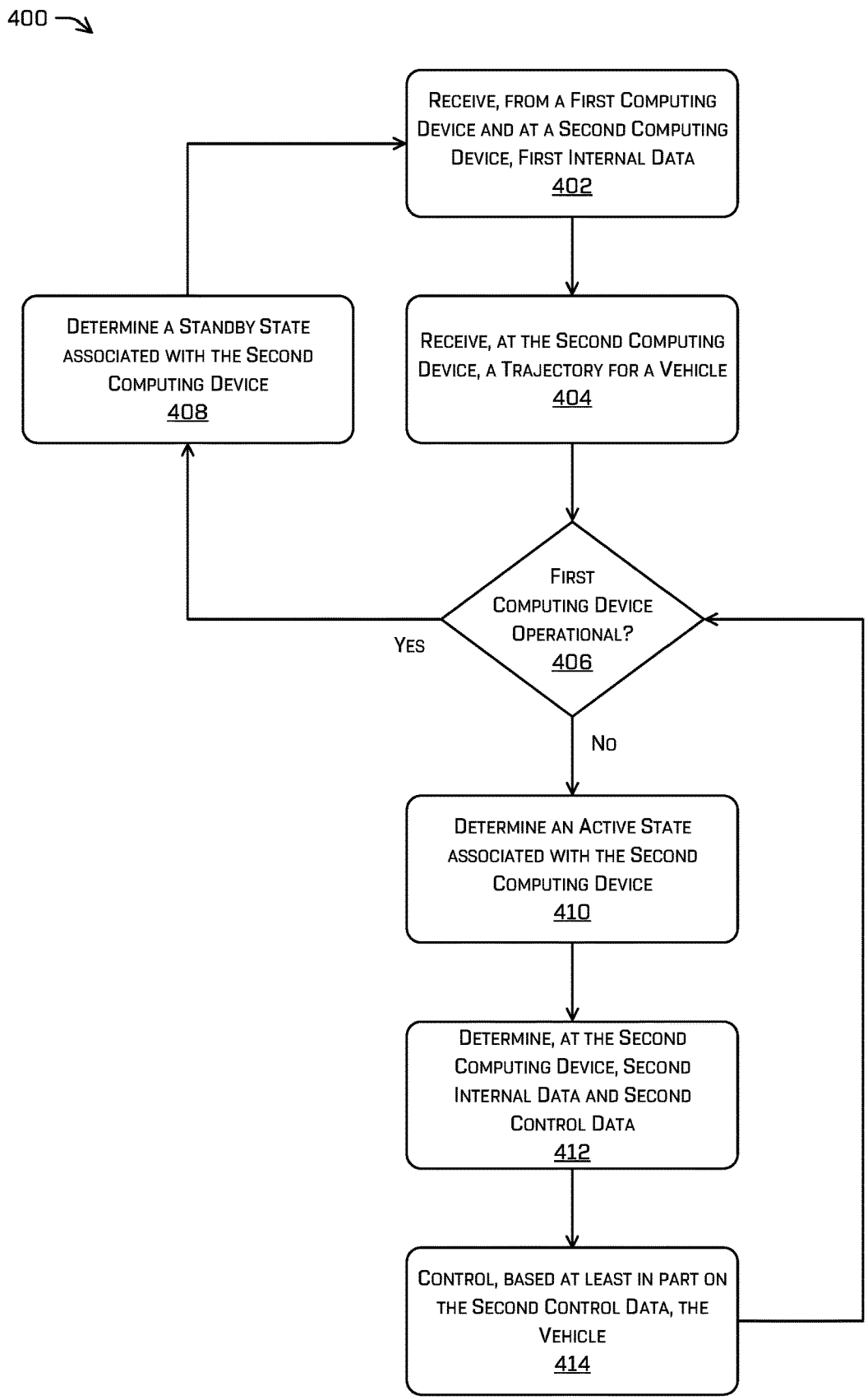
FIG. 4 is a flow diagram representative of one or more processes for vehicle multi-controller synchronization, as described herein.

FIG. 4 illustrates an example process in accordance with embodiments of the disclosure. This process is illustrated as a logical flow graph, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process.

FIG. 4 depicts an example process 400 for determining whether a computing device should control the vehicle or remain in a standby state. In some instances, some or all of process 400 can be performed by one or more components in FIGS. 1, 2, and 3A-3C as described herein. The process 400 is described with reference to the vehicle 202 in FIG. 2 and/or the vehicle 102 in FIG. 1. Additionally, some portions of process 400 can be omitted, replaced, and/or reordered while still providing the functionality of determining whether a computing device should remain in a standby state.

At operation 402, a second computing device (or secondary computing device 112), can receive first internal data from a first computing device (or primary computing device 110).

At operation 404, the second computing device can receive a trajectory for a vehicle. In some instances, the trajectory can be transmitted by a main computing device 104. In some instances, the trajectory can be a go trajectory, a no-go trajectory, and/or an e-stop trajectory.

At operation 406, the second computing device can determine if the first computing device is operational. For example, the second computing device can determine a capability status associated with the first computing device. In some instances, the capability status can indicate an error or a malfunction associated with the first computing device.

At operation 408, and if the second computing device determines that the first computing device is operational, the second computing device determines a standby state associated with the second computing device and returns to operation 402.

At operation 410, and if the second computing device determines that the first computing device is not operational, the second computing device determines an active state associated with the second computing device.

At operation 412, the second computing device determines second internal data and second control data based on the trajectory received at operation 404. In some instances, the second computing device can determine the second internal data and/or the second control data based on the trajectory as well as vehicle data (e.g., current/previous position/positions of the vehicle and/or current/previous velocity/velocities of the vehicle). In some instances, the second computing device can transmit the second internal data to the first computing device.

At operation 414, the second computing device can control the vehicle based at least in part on the second control data. In some instances, the second computing device can transmit the second control data to actuator(s) 114 to control the vehicle. Then, the process 400 returns to operation 406 where the second computing device can determine if the first computing device is operational again.

Accordingly, the techniques discussed herein provide a robust framework for vehicle synchronization of multiple trackers and/or computing systems so that a vehicle can continue operating in a safe manner.

EXAMPLE CLAUSES

A: A system comprising: one or more processors; and one or more computer-readable media storing computer-executable instructions that, when executed, cause the one or more processors to perform operations comprising: receiving, at a primary computing device, a first trajectory and a second trajectory for an autonomous vehicle, the first trajectory comprising a first set of positions, orientations, and velocities to traverse through an environment and the second trajectory comprising a second set of positions, orientations, and velocities to stop the autonomous vehicle in the environment; receiving, at a secondary computing device, the second trajectory; determining, at the primary computing device, vehicle state data, the vehicle state data comprising one or more of a current position, a current velocity, a plurality of previous positions, or a plurality of previous velocities; determining, at the primary computing device and based at least in part on the vehicle state data and the first trajectory, first internal data; determining, at the primary computing device and based at least in part on the first internal data, first control data comprising at least one of first steering data or first acceleration data; transmitting, from the primary computing device to the secondary computing device, one or more of the first internal data or the vehicle state data; determining, at the secondary computing device, an error state associated with the primary computing device; determining, at the secondary computing device and based at least in part on the first internal data and the second trajectory, second internal data; determining, at the secondary computing device and based at least in part on the second internal data, second control data comprising at least one of second steering data or second acceleration data; and controlling, based at least in part on the second control data and by the secondary computing device, the autonomous vehicle to follow the second trajectory.

B: The system of paragraph A, wherein determining the error state comprises at least one of: receiving, at the secondary computing device and from the primary computing device, a capability status indicating that the primary computing device is malfunctioning; or determining, at the secondary computing device, that a time period associated with the first internal data has expired.

C: The system of paragraph B, the operations further comprising: determining, at the secondary computing device and based at least in part on determining the capability status of the primary computing device, an active state associated with the secondary computing device, wherein controlling the autonomous vehicle by the secondary computing device is based at least in part on determining the active state associated with the secondary computing device.

D: The system of any of paragraphs A-C, the operations further comprising: determining, at the secondary computing device and based at least in part on the second internal data or a second error associated with the secondary computing device, to execute a third trajectory comprising an emergency stop trajectory.

E: A method comprising: receiving, at a first computing device, a trajectory for a vehicle; determining, at the first computing device, vehicle data associated with the vehicle; determining, based at least in part on vehicle data and at the first computing device, internal data; determining, based at least in part on the internal data, control data; transmitting, to a second computing device and from the first computing device, one or more of the internal data or the vehicle data; and controlling, based at least in part on the control data, the vehicle to follow the trajectory.

F: The method of paragraph E, further comprising: determining an error state associated with the first computing device, the error state indicating at least one of a malfunction, an error condition, or a fault condition.

G: The method of paragraph F, wherein controlling the vehicle is at a first time, the method further comprising: determining, based at least in part on determining the error state associated with the first computing device, a standby state associated with the first computing device at a second time; and determining that the second computing device is controlling the vehicle.

H: The method of paragraph F or G, further comprising: transmitting, to the second computing device and from the first computing device, time data indicating at least one of an operational state or an active state of the first computing device, wherein determining the error state associated with the first computing device is based at least in part on determining that a time period associated with the time data has expired.

I: The method of any of paragraphs E-H, wherein the internal data is first internal data and the control data is first control data, the method further comprising: determining an active state associated with the first computing device at a third time; receiving, from the second computing device and at the first computing device, second internal data; determining, based at least in part on the second internal data, second control data; and controlling, based at least in part on the second control data, the vehicle.

J: The method of any of paragraphs E-I, wherein the vehicle data comprises at least one of a current position, a current velocity, a plurality of previous positions, or a plurality of previous velocities, and wherein determining the internal data is based at least in part on one or more of a proportional-integral controller or a proportional-integral-derivative controller.

K: The method of any of paragraphs E-J, wherein determining the control data comprises: determining a difference between the trajectory and the vehicle data; determining, based at least in part on the difference and the internal data, at least one of steering data or acceleration data, wherein the control data comprises at least one of the steering data or the acceleration data; and transmitting, to an actuator from the first computing device, the control data, the actuator associated with at least one of a steering system, a braking system, or a motor system of the vehicle.

L: The method of any of paragraphs E-K, wherein transmitting the internal data comprises transmitting the internal data at one of a fixed frequency or an intermittent frequency.

M: The method of any of paragraphs E-L, wherein the trajectory is determined by a third computing device, the trajectory determined to avoid an obstacle in an environment.

N: A non-transitory computer-readable medium storing instructions executable by a processor, wherein the instructions, when executed, cause the processor to perform operations comprising: receiving, from a first computing device and at a second computing device, internal data determined by the first computing device; determining, at the second computing device, a standby state associated with the second computing device at a first time; determining, at the second computing device, an active state associated with the second computing device at a second time after the first time; receiving, at the second computing device, a trajectory for a vehicle; determining, at the second computing device, a difference between the trajectory and a vehicle state, the vehicle state comprising at least one of a current position associated with the vehicle, a current velocity associated with the vehicle, a plurality of previous positions associated with the vehicle, or a plurality of previous velocities associated with the vehicle; determining control data based at least in part on the difference and the internal data; and controlling, based at least in part on the control data and by the second computing device, the vehicle.

O: The non-transitory computer-readable medium of paragraph N, wherein determining the active state is based at least in part on one of: determining, at the second computing device, error data indicating at least one of a malfunction, an error condition, or a fault condition associated with the first computing device; determining, at the second computing device, that a time period associated with the internal data has expired; or receiving, at the second computing device, command data indicating that the second computing device is to control the vehicle.

P: The non-transitory computer-readable medium of paragraph N or O, wherein the trajectory comprises at least one of a first trajectory to traverse through an environment or a second trajectory to stop the vehicle in the environment.

Q: The non-transitory computer-readable medium of any of paragraphs N-P, wherein the internal data is first internal data, the operations further comprising: determining, at the second computing device and based at least in part on the first internal data, second internal data, wherein determining the control data is further based at least in part on the second internal data.

R: The non-transitory computer-readable medium of paragraph Q, the operations further comprising: transmitting, from the second computing device and to the first computing device, the second internal data.

S: The non-transitory computer-readable medium of any of paragraphs N-R, wherein the control data comprises at least one of steering data or acceleration data, and wherein controlling the vehicle comprises: transmitting, from the second computing device and to an actuator, the control data, the actuator associated with at least one of a steering system, a braking system, or a motor system of the vehicle.

T. The non-transitory computer-readable medium of any of paragraphs N-S, wherein the trajectory is determined by a third computing device, the trajectory determined to avoid an obstacle in an environment.

While the example clauses described above are described with respect to one particular implementation, it should be understood that, in the context of this document, the content of the example clauses can also be implemented via a method, device, system, and/or computer-readable medium.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:
one or more processors; and
one or more computer-readable media storing computer-executable instructions that, when executed, cause the one or more processors to perform operations comprising:
receiving, at a primary computing device, a first trajectory and a second trajectory for an autonomous vehicle, the first trajectory comprising a first set of positions, orientations, and velocities to traverse through an environment and the second trajectory comprising a second set of positions, orientations, and velocities to stop the autonomous vehicle in the environment;
receiving, at a secondary computing device, the second trajectory;
determining, at the primary computing device, vehicle state data, the vehicle state data comprising one or more of a current position, a current velocity, a plurality of previous positions, or a plurality of previous velocities;
determining, at the primary computing device and based at least in part on the vehicle state data and the first trajectory, first internal data;
determining, at the primary computing device and based at least in part on the first internal data, first control data comprising at least one of first steering data or first acceleration data;
transmitting, from the primary computing device to the secondary computing device, one or more of the first internal data or the vehicle state data;
determining, at the secondary computing device, an error state associated with the primary computing device;
determining, at the secondary computing device and based at least in part on the first internal data and the second trajectory, second internal data;
determining, at the secondary computing device and based at least in part on the second internal data, second control data comprising at least one of second steering data or second acceleration data; and
controlling, based at least in part on the second control data and by the secondary computing device, the autonomous vehicle to follow the second trajectory.

2. The system of claim 1, wherein determining the error state comprises at least one of:
receiving, at the secondary computing device and from the primary computing device, a capability status indicating that the primary computing device is malfunctioning; or
determining, at the secondary computing device, that a time period associated with the first internal data has expired.

3. The system of claim 2, the operations further comprising:
determining, at the secondary computing device and based at least in part on determining the capability status of the primary computing device, an active state associated with the secondary computing device,
wherein controlling the autonomous vehicle by the secondary computing device is based at least in part on determining the active state associated with the secondary computing device.

4. The system of claim 1, the operations further comprising:
  determining, at the secondary computing device and based at least in part on the second internal data or a second error associated with the secondary computing device, to execute a third trajectory comprising an emergency stop trajectory.

5. A method comprising:
  receiving, at a first computing device, a trajectory for a vehicle;
  determining, at the first computing device, vehicle state data associated with the vehicle;
  determining, at the first computing device and based at least in part on vehicle state data and the trajectory, internal data;
  determining, based at least in part on the internal data, control data;
  determining a difference between the trajectory and the vehicle state data;
  determining, based at least in part on the difference and the internal data, at least one of steering data or acceleration data, wherein the control data comprises at least one of the steering data or the acceleration data;
  transmitting, to a second computing device and from the first computing device, one or more of the internal data or the vehicle state data; and
  controlling, based at least in part on the control data, the vehicle to follow the trajectory.

6. The method of claim 5, further comprising:
  determining an error state associated with the first computing device, the error state indicating at least one of a malfunction, an error condition, or a fault condition.

7. The method of claim 6, wherein controlling the vehicle is at a first time, the method further comprising:
  determining, based at least in part on determining the error state associated with the first computing device, a standby state associated with the first computing device at a second time; and
  determining that the second computing device is controlling the vehicle.

8. The method of claim 6, further comprising:
  transmitting, to the second computing device and from the first computing device, time data indicating at least one of an operational state or an active state of the first computing device,
  wherein determining the error state associated with the first computing device is based at least in part on determining that a time period associated with the time data has expired.

9. The method of claim 5, wherein the internal data is first internal data and the control data is first control data, the method further comprising:
  determining an active state associated with the first computing device at a third time;
  receiving, from the second computing device and at the first computing device, second internal data;
  determining, based at least in part on the second internal data, second control data; and
  controlling, based at least in part on the second control data, the vehicle.

10. The method of claim 5, wherein the vehicle state data comprises at least one of a current position, a current velocity, a plurality of previous positions, or a plurality of previous velocities, and
  wherein determining the internal data is based at least in part on one or more of a proportional-integral controller or a proportional-integral-derivative controller.

11. The method of claim 5, wherein determining the control data comprises:
  transmitting, to an actuator from the first computing device, the control data, the actuator associated with at least one of a steering system, a braking system, or a motor system of the vehicle.

12. The method of claim 5, wherein transmitting the internal data comprises transmitting the internal data at one of a fixed frequency or an intermittent frequency.

13. The method of claim 5, wherein the trajectory is determined by a third computing device, the trajectory determined to avoid an obstacle in an environment.

14. One or more non-transitory computer-readable media storing instructions executable by one or more processors, wherein the instructions, when executed, cause the one or more processors to perform operations comprising:
  receiving, from a first computing device and at a second computing device, internal data determined by the first computing device, wherein the internal data is based at least in part on first vehicle state data and a trajectory;
  determining, at the second computing device, a standby state associated with the second computing device at a first time;
  determining, at the second computing device, an active state associated with the second computing device at a second time after the first time;
  receiving, at the second computing device, the trajectory for a vehicle;
  determining, at the second computing device, a difference between the trajectory and second vehicle state data, the second vehicle state data comprising at least one of a current position associated with the vehicle, a current velocity associated with the vehicle, a plurality of previous positions associated with the vehicle, or a plurality of previous velocities associated with the vehicle;
  determining control data based at least in part on the difference and the internal data; and
  controlling, based at least in part on the control data and by the second computing device, the vehicle.

15. The one or more non-transitory computer-readable media of claim 14, wherein determining the active state is based at least in part on one of:
  determining, at the second computing device, error data indicating at least one of a malfunction, an error condition, or a fault condition associated with the first computing device;
  determining, at the second computing device, that a time period associated with the internal data has expired; or
  receiving, at the second computing device, command data indicating that the second computing device is to control the vehicle.

16. The one or more non-transitory computer-readable media of claim 14, wherein the trajectory comprises at least one of a first trajectory to traverse through an environment or a second trajectory to stop the vehicle in the environment.

17. The one or more non-transitory computer-readable media of claim 14, wherein the internal data is first internal data, the operations further comprising:
  determining, at the second computing device and based at least in part on the first internal data, second internal data,
  wherein determining the control data is further based at least in part on the second internal data.

18. The one or more non-transitory computer-readable media of claim 17, the operations further comprising:
    transmitting, from the second computing device and to the first computing device, the second internal data.

19. The one or more non-transitory computer-readable media of claim 14, wherein the control data comprises at least one of steering data or acceleration data, and wherein controlling the vehicle comprises:
    transmitting, from the second computing device and to an actuator, the control data, the actuator associated with at least one of a steering system, a braking system, or a motor system of the vehicle.

20. The one or more non-transitory computer-readable media of claim 14, wherein the trajectory is determined by a third computing device, the trajectory determined to avoid an obstacle in an environment.

\* \* \* \* \*